May 2, 1950 W. R. COLEY 2,506,490

EARPIECE WITH PLURAL SOUND PASSAGES

Filed Aug. 30, 1946 2 Sheets-Sheet 1

WITNESSES:
E. L. Leiding.

INVENTOR
William R. Coley.
BY
William R. Coley
ATTORNEY

May 2, 1950 W. R. COLEY 2,506,490

EARPIECE WITH PLURAL SOUND PASSAGES

Filed Aug. 30, 1946 2 Sheets-Sheet 2

WITNESSES:
E. A. Liding

INVENTOR
William R. Coley.
BY
William R. Coley
ATTORNEY

Patented May 2, 1950 2,506,490

UNITED STATES PATENT OFFICE 2,506,490

EARPIECE WITH PLURAL SOUND PASSAGES

William R. Coley, Edgewood, Pa.

Application August 30, 1946, Serial No. 694,120

5 Claims. (Cl. 181—23)

My invention relates to earpieces for use in an electrical hearing aid, and it has particular reference to an earpiece permitting the normal use of a telephone while the earpiece remains in the ear of the wearer.

One of the difficulties in connection with electrical hearing aids is the use thereof in telephone conversations. With the ordinary molded large earpiece to which the magnetic steel disc or vibrating diaphragm device is attached outside the ear, it is not feasible to hear a telephone conversation by placing the receiver of the telephone in proximity to said earpiece assembly.

The two other alternatives are to attempt to receive the telephone message by placing the receiving end of the receiver close to the opening in the hearing aid microphone, or to remove the entire earpiece assembly from the ear and listen in the natural way to the telephone, if the deaf person has not incurred too serious an impairment of hearing to permit such use.

The use of the telephone receiver-microphone combination is very inconvenient and unsatisfactory, particularly with the widely-used French phone, since the receiver must be placed in front of the deaf person's mouth for the speaking end of the telephone conversation and then placed properly over the microphone for the hearing end of the conversation. In many cases, there is not sufficient time to make a shift from the speaking to the hearing position without missing some of the other person's conversation and, in general, such a conversation is awkward and unsatisfactory.

Moreover, such use of the microphone constitutes two additional conversions of energy from sound to electricity and vice versa in the telephone conversation, so that the reception by the deaf person is distorted or blurred in many cases.

It would be possible for a certain magnitude of sound to pass from the telephone receiver through special holes drilled in the usual large earpiece so that sound waves may pass through these holes into or near the ear drum. However, the presence of the magnetic steel disc assembly prevents placing the telephone receiver as close as it should be to such holes, with the result that again the reception of sound by the deaf person is unsatisfactory in that a proper and clear reception of the speech by the party at the other end of the line is not possible.

Recently a special ear mold has been placed on the market. This mold comprises a relatively small or thin earpiece, preferably made of molded plastic or the like, and a small plastic or the like disc containing a spring ring for receiving the standard button on the magnetic steel assembly. The molded earpiece and the disc are joined by a foot or so of plastic tube for conveying the sound waves from the magnetic diaphragm device which, in this case, is worn under the clothing, to and through the molded earpiece to the ear drum.

The use of such a molded earpiece tightly fitting, as it does, the internal recesses of the ear again prevents the proper and clear reception of sound waves when the receiver of the telephone is placed close to the ear, although, of course, a greater volume of sound may be received in this way than is the case when the telephone receiver is placed next to the usual large earpiece and magnetic steel disc assembly.

One object of my invention, therefore, is to provide an earpiece whereby a clear and intelligible telephone conversation may be maintained by a deaf person wearing the earpiece in the ear to which the telephone receiver is placed, so that to all practical intents and purposes such a deaf person utilizes the telephone receiver in exactly the same way as a person with normal hearing.

Another object of my invention is to provide an earpiece, preferably of the above-mentioned special type, having an air passage associated therewith for transmitting sound from a telephone receiver towards the ear drum of the person wearing the earpiece.

A further object of my invention is to provide an earpiece either having one or more openings therethrough or having one or more air passages, such as grooves or indentations, over its surface to permit sound waves from a telephone receiver held or pressed to the ear to pass uninterruptedly toward the ear drum of the wearer of the earpiece.

Another object of my invention is to provide a hearing aid including an earpiece having a projection for disposal near the ear drum of the wearer and having a first air passage extending from other parts of the hearing aid into the earpiece and its projection for transmitting sound emanating from the magnetic disc of said hearing aid toward the ear drum, the earpiece also having a second air passage associated therewith independently of the first air passage for transmitting sound from a telephone receiver toward the ear drum.

Other objects of my invention will become evident from the following detailed description, taken in conjunction with the accompanying drawings, in which.

Figure 1:
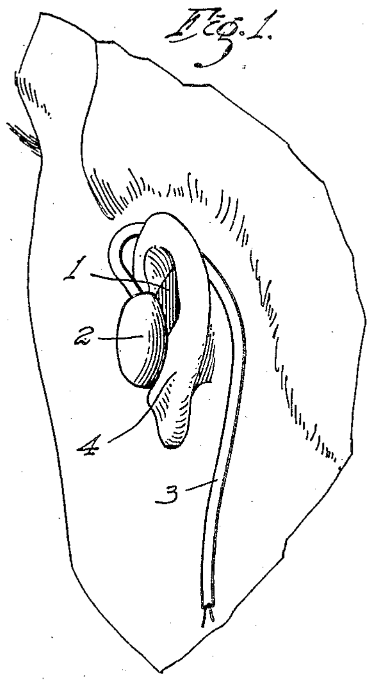
Figure 1 is a partial view, taken from the left side rear, of a person's head and ear, in which is shown a hearing aid of the generally used type, including a magnetic diaphragm or disc assembly, together with a molded earpiece.

Referring to the drawings, in Fig. 1 the generally used prior art ear assembly is shown disposed in the left ear of the wearer, the view being taken from the left rear.

The body 1 of the plastic or molded earpiece proper is disposed in the ear channels in the usual way, and the usual magnetic disc assembly 2 is detachably secured thereto in accordance with a familiar practice. One method of wearing the cable or wire cord 3 which extends from the magnetic disc to the microphone of the hearing aid is to pass it over the top and rear side of the ear 4, as shown.

It will be noted that the earpiece 1 and the magnetic disc 2 inherently, because of their necessary size, result in the magnetic disc 2 projecting beyond the outer plane of the ear 4.

Figure 2:
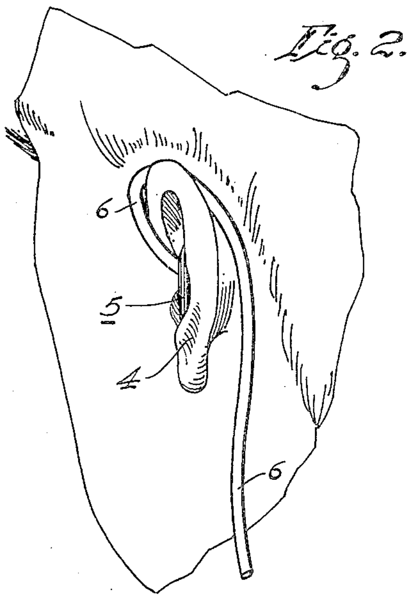
Fig. 2 is a similar view showing the above-mentioned special ear mold disposed well within the ear, no magnetic disc or diaphragm device being utilized in direct connection with the earpiece.

On the other hand, in Fig. 2, where the above-mentioned special ear mold is used, only a very small portion, if any, of this plastic or molded earpiece proper 5 shows in the view, as the earpiece is relatively small and fits well within the ear 4. In lieu of the electric cable 3 of Fig. 1, a small plastic or rubber tube 6 extends from the earpiece proper 5 over the ear and thus communicates with the magnetic disc and microphone of the hearing aid, as described in more detail later.

Figure 3:
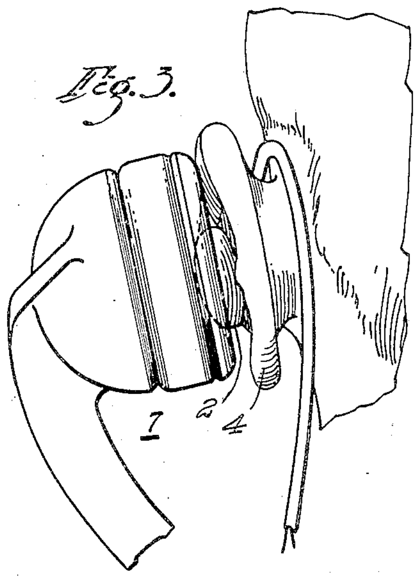
Fig. 3 is a view, taken from directly in back of a person's head, showing the earpiece and magnetic disc of Fig. 1 in place and a telephone receiver disposed against the magnetic disc, showing the impossibility of placing the receiver close to or pressed against the ear because of the mechanical interference set up by this earpiece and magnetic disc.

In Fig. 3, there is shown a telephone receiver 7 disposed near the prior art ear assembly shown also in Fig. 1, from which it will be noted that the projecting magnetic disc 2 necessarily, because of mechanical interference of parts, prevents the telephone receiver 7 from being held close to the ear. For this reason, it is useless to endeavor to utilize a telephone receiver with such an earpiece assembly, since the sound from the telephone receiver thus does not reach the eardrum with sufficient volume and clarity.

Figure 4:
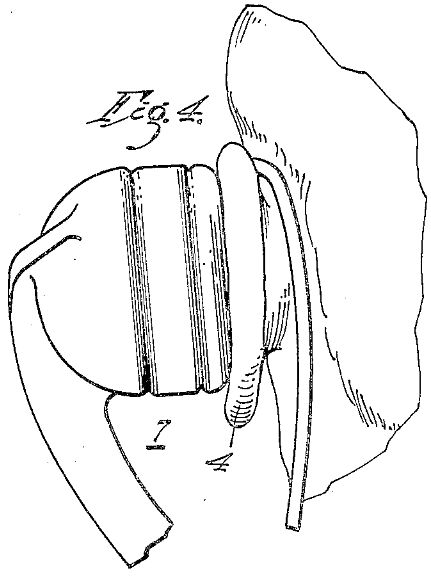
Fig. 4 is a view, similar to Fig. 3, with the above-mentioned special ear mold in place and showing that a telephone receiver when this particular ear mold is used may be held to or pressed against the ear in the normal manner so that sound waves enter the channels of the ear in the normal way.

On the other hand, in Fig. 4, in which the special ear mold of Fig. 2 is also used, it will be noted that, because of the fact that this ear mold 5 is disposed well within the ear 4, the telephone receiver 7 may be held to or pressed against the ear 4 in the same manner as a person of normal hearing disposes the receiver when telephoning.

This feature of being able to dispose the telephone receiver in a normal contacting position with the ear contributes materially toward my present invention, as will be appreciated.

Figure 5:
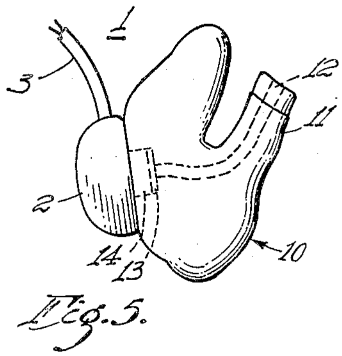
Fig. 5 and Fig. 6 are, respectively, similar views of the generally used prior art type of earpiece assembly and of the above-mentioned special ear mold. The difference in lateral dimension, that is, the thickness from the ear drum to the outer surface of the earpiece assembly, is very noticeably smaller in the case of Fig. 6.

In Fig. 5, the parts of the generally used earpiece assembly of Fig. 1 are shown in detail. The earpiece assembly 1 is illustrated as comprising a body member 10 which is preferably molded to fit the internal channels of the wearer's ear and which includes a projection or snout 11 for extending through the ear drum channel toward or close to the ear drum itself. A suitable internal opening as 12 extends from the outflow end of the projection 11 over to an opening 13 in the outer side of the earpiece proper, into which opening the spring button or fastening means 14 of the magnetic disc 2 is snapped.

Figure 6:
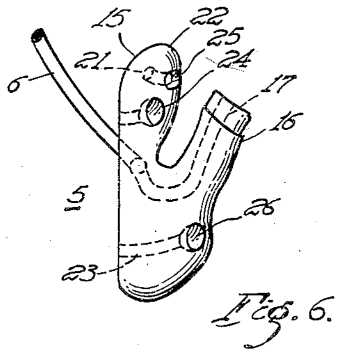

On the other hand, in Fig. 6 where the special ear mold 5 of Fig. 2 is shown in detail, the body member 15 is smaller in depth since it is unnecessary to build the same out to the outer plane of the ear 4 for the purpose of attachment to the magnetic earpiece 2.

As a result, this body member 15 is molded to fit only some of the inner recesses of the ear, thus fitting well within the same, the snout or projection 16, of course, being similar in character to 11 and extending close to the ear drum.

A suitable opening 17 extends from the outflow end of the projection 16 to the inner end of the plastic tube 6 which is molded or otherwise suitably secured into the body 15.

The decrease in depth or thickness of the earpiece of Fig. 6 relative to the unavoidable depth of the combined earpiece and magnetic disc of Fig. 5 is very noticeable, and this decided difference in depth is very useful in the operation of the present invention as described above in connection with Fig. 4, for example.

Figure 7:
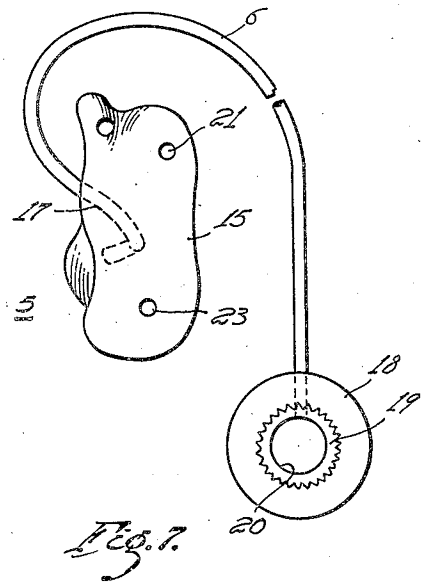
Fig. 7 is a view in elevation of the entire special ear mold device, including the means for fastening to the usual magnetic disc of the hearing aid.

Fig. 7 shows the entire special ear mold assembly comprising the body 15 of Fig. 6 and the opening 17 which, as noted above, communicates with the tube 6. This tube may be of any desired length, something in the neighborhood of one foot being satisfactory to permit the tube to be draped over the ear, as shown in Fig. 2, and extend to a transparent or other plastic disc 18, or the like, which is provided with a central metallic ring 19 having an opening 20 for receiving the button or fastening device 14 of the magnetic disc of Fig. 5.

It will be noted that in this way the magnetic disc 2 and the plastic disc 18 may be disposed beneath the wearer's shirt or other clothing, and the cord or cable 3 then extends from this magnetic disc to the microphone of the hearing aid.

Figure 8:
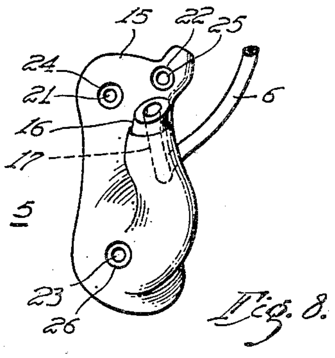
Fig. 8 is a view taken from the inner side of the earpiece shown in Fig. 6.

In Figs. 6, 7 and 8, which are all different views of the above-mentioned special ear mold as embodied in the present invention, it will be noted that a plurality of holes are drilled, molded or otherwise formed in the body 15, these holes 21, 22 and 23 being spaced around the body 15 as desired. Each of these holes extends through the plastic material at the particular region drilled, and these three holes 21, 22 and 23, respectively, preferably terminate in enlarged outflow openings 24, 25 and 26.

As a result, when the telephone receiver 7 is held to the ear, as shown in Fig. 4, with the earpiece 5 remaining therein in normal position, sound waves from the vibrating diaphragm of the receiver pass through the holes 21, 22 of Fig. 6 and 23 and transmit such sound waves toward the ear of the wearer.

Consequently, the wearer of an earpiece assembly constructed in accordance with the present invention may, if his hearing impairment is not too great, conduct a normal telephone conversation in a normal way, that is, by merely manipulating the telephone receiver in the same way that he would if he had no hearing impairment.

The purpose of the enlarged outflow openings 24, 25 and 26 on the respective holes 21, 22 and 23 is to provide a certain megaphonic action to somewhat increase the sound emitted from the openings, although, of course, it is not absolutely necessary in many cases that these enlarged openings be provided.

Furthermore, it is not, of course, necessary that three holes be drilled through the body 15, as noted, since in many cases even a single opening will be sufficient. In the applicant's case, the holes drilled were only $^1/_{16}$ of an inch in diameter, although this size does not in any way appear to be critical.

Figure 9:
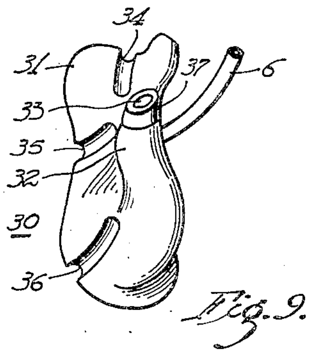
Fig. 9 is a similar view showing a modified form of the present invention.

Fig. 9 shows a modification of the present invention in which, instead of using air passages of the type shown in Figs. 6, 7 and 8, namely, interior holes, I have shown an earpiece 30 in which the body portion 31 is provided with a number of spaced exterior indentations or surface grooves 34, 35 and 36 running over the outer surface of the body 31 toward the ear drum of the wearer. Such grooves may, of course, be cut, molded or otherwise formed.

The body 31, of course, is provided with a projection or snout 32 having the usual outflow opening 33.

Another modification which may be useful in some cases to permit a better flow of sound waves to the ear drum is to reduce slightly the diameter of the end of the projection or snout 32, as indicated by the reference character 37, thus producing an additional sound-conducting air space on the earpiece, if desired.

Consequently, by the use of my present invention as illustrated, or its equivalent, it is possible for the first time known to me to transmit sound waves in a normal way from the vibrating diaphragm of a telephone receiver to the ear drum of a person who is wearing an earpiece or ear mold in the ear being used with the telephone. This result is made possible by the use of some form of air spaces, internal or external, or a combination thereof, associated with the earpiece, to permit the flow of sound waves through these air spaces from the telephone receiver diaphragm to or towards the ear drum.

It will be noted that a deaf person using this special ear mold, improved as stated above, will thus be able to utilize a telephone receiver in the normal manner in connection with the same ear without having to remove the ear mold. Such action not only permits direct hearing from the telephone receiver for deaf persons whose hearing impairment is not too great, but at the same time, of course, permits the concurrent use of the entire electrical aid by merely temporarily removing the telephone receiver from the ear or by leaving the receiver pressed to the ear, as the wearer pleases.

For example, where a prior art ear mold assembly is removed from the ear in order to telephone, then if someone opens the door of an office, for example, and speaks to the deaf person using the phone, the latter is totally unable to understand what was said by the person at the door. On the other hand, by the use of the novel ear mold described above, when a person opens the door, the telephoning person may immediately say into the telephone, "Excuse me a minute," or the like, and merely listen as he normally does with the use of his hearing aid to the person at the door, after which he can immediately resume his telephone conversation.

The improved special ear mold described above constitutes the only method known to the applicant, who has been deaf for over twelve years, for listening in a normal way over the telephone without going through the mechanical and disadvantageous operations of removing and probably having to shut off the hearing aid so that it will not squeal and then, after the telephone conversation, replacing the ear mold and switching the hearing aid "on" again. The reduction in physical and mental effort in the course of a day for a deaf person wearing a hearing aid will be very noticeable. The improved arrangement thus permits a deaf person whose hearing is not too seriously impaired to handle a telephone conversation and at the same time hear other sounds, whereas no other possible device or simple operation known to the applicant makes such a condition possible.

While I have disclosed certain arrangements for achieving the desired results, I do not wish to be restricted to the specific structures or methods disclosed, inasmuch as various modifications thereof may be made without departing from the spirit and scope of my invention. I desire, therefore, that only such limitations shall be imposed thereon as are indicated in the appended claims.

I claim as my invention:

1. A hearing aid including, a receiver, and an earpiece having a projection for disposal in the channel of the ear toward the eardrum, and a recess to which said receiver is connected, said earpiece having a first air passage extending from said receiver thru the ear piece and said projection for transmitting sound from said receiver toward the ear drum and having at least one air passage independent of said first air passage extending thru said ear piece from the outside surface toward the channel of the ear for transmitting sound from a telephone receiver held to the ear, towards the eardrum.

2. A hearing aid including, a receiver, and an earpiece having a projection for disposal in the channel of the ear toward the eardrum, and a recess to which said receiver is connected, said earpiece having a first air passage extending from said receiver thru the ear piece and said projection for transmitting sound from said receiver toward the ear drum and having at least one air passage independent of said first air passage extending thru said ear piece from the outside surface toward the channel of the ear for transmitting sound from a telephone receiver held to the ear, towards the eardrum, said at least one air passage having a bell shaped outflow opening.

3. A hearing aid including, a receiver, and an earpiece having a projection for disposal in the channel of the ear toward the eardrum, and a recess to which said receiver is connected, said earpiece having a first air passage extending from said receiver thru the ear piece and said projection for transmitting sound from said receiver toward the ear drum and having at least one air passage independent of said first air passage extending thru said ear piece from the outside surface toward the channel of the ear for transmitting sound from a telephone receiver held to the ear, towards the eardrum, said at least one passage having a total cross section area of approximately .01 square inch.

4. A hearing aid including, a receiver having a flexible sound conducting tube for conducting sound from the receiver, and an ear piece arranged to fit into the ear, said ear piece having a projection extending into the channel of the ear toward the eardrum and a connector on the outside surface for attachment to the end of said sound conducting tube, a first air passage extending from said connector thru said ear piece and said projection toward the eardrum, and a second air passage independent of said first air passage extending from the outside surface thru the earpiece toward the channel of the ear, whereby the sound from a telephone receiver held at the ear will be transmitted thru the earpiece independent of said receiver and said first air passage.

5. A hearing aid including, a receiver, and an earpiece having a recess to which said receiver is connected and having a first air passage extending from said receiver thru the earpiece toward the channel of the ear for transmitting sound from said receiver toward the ear drum, and having at least one other air passage independent of said first air passage, extending thru said ear piece toward the channel of the ear and located above the horizontal plane of said first air passage, for transmitting sound from a telephone receiver held to the ear, toward the ear drum, independent of said first air passage.

WILLIAM R. COLEY.

REFERENCES CITED

The following references are of record in the file of this patent:

UNITED STATES PATENTS

| Number | Name | Date |
|---|---|---|
| 1,581,700 | Summer | Apr. 20, 1926 |
| 1,624,144 | Mathieu | Apr. 12, 1927 |
| 1,830,198 | French | Nov. 3, 1931 |
| 2,012,877 | Iwasa | Aug. 27, 1935 |
| 2,312,534 | Fiene | Mar. 2, 1943 |